US009783762B2

(12) United States Patent
Takahashi et al.

(10) Patent No.: US 9,783,762 B2
(45) Date of Patent: Oct. 10, 2017

(54) WORKING FLUID COMPOSITION FOR REFRIGERATING MACHINE AND REFRIGERATING MACHINE OIL

(71) Applicant: JX Nippon Oil & Energy Corporattion, Chiyoda-ku, Tokyo (JP)

(72) Inventors: Hitoshi Takahashi, Tokyo (JP); Takeshi Okido, Tokyo (JP); Hiroko Shimpo, Tokyo (JP); Souichirou Konno, Tokyo (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 0 days.

(21) Appl. No.: 15/113,138

(22) PCT Filed: Jan. 16, 2015

(86) PCT No.: PCT/JP2015/051106
§ 371 (c)(1),
(2) Date: Jul. 21, 2016

(87) PCT Pub. No.: WO2015/111522
PCT Pub. Date: Jul. 30, 2015

(65) Prior Publication Data
US 2017/0002291 A1    Jan. 5, 2017

(30) Foreign Application Priority Data

Jan. 21, 2014 (JP) .................................. 2014-008589

(51) Int. Cl.
*C09K 5/04* (2006.01)
*C10M 171/00* (2006.01)
*C10M 105/32* (2006.01)
*C10M 105/38* (2006.01)
*C10M 105/42* (2006.01)

(52) U.S. Cl.
CPC ......... *C10M 171/008* (2013.01); *C09K 5/041* (2013.01); *C09K 5/045* (2013.01); *C10M 105/32* (2013.01); *C10M 105/38* (2013.01); *C10M 105/42* (2013.01); *C09K 2205/106* (2013.01); *C09K 2205/122* (2013.01); *C09K 2205/22* (2013.01); *C10M 2207/026* (2013.01); *C10M 2207/283* (2013.01); *C10M 2207/2835* (2013.01); *C10M 2207/30* (2013.01); *C10M 2207/301* (2013.01); *C10M 2207/302* (2013.01); *C10M 2207/304* (2013.01); *C10M 2207/3025* (2013.01); *C10M 2207/3045* (2013.01); *C10N 2220/302* (2013.01); *C10N 2220/306* (2013.01); *C10N 2230/06* (2013.01); *C10N 2240/30* (2013.01)

(58) Field of Classification Search
CPC . C10M 171/008; C10M 105/46; C09K 5/041; C09K 5/045; C09K 2205/106; C09K 2205/122
See application file for complete search history.

(56) References Cited

U.S. PATENT DOCUMENTS

| 4,064,058 A | 12/1977 | Walker |
| 5,096,606 A | 3/1992 | Hagihara et al. |
| 6,582,621 B1* | 6/2003 | Sasaki ................... C09K 5/045 252/67 |
| 6,828,287 B1 | 12/2004 | Lakes et al. |
| 2010/0038583 A1* | 2/2010 | Shimomura .......... C09K 5/044 252/68 |
| 2010/0117022 A1 | 5/2010 | Carr et al. |
| 2011/0079749 A1* | 4/2011 | Carr ..................... C10M 105/42 252/68 |

FOREIGN PATENT DOCUMENTS

| EP | 0 440 069 A1 | 8/1991 |
| EP | 0 501 440 A1 | 9/1992 |
| EP | 2 930 228 A1 | 10/2015 |
| JP | H6-025682 A | 2/1994 |
| JP | 7-507346 A | 8/1995 |
| JP | 2002-129179 A | 5/2002 |
| JP | 2011-184536 A | 9/2011 |
| JP | 2012-508807 A | 4/2012 |
| JP | 2012-102235 A | 5/2012 |
| JP | 2013-170255 A | 9/2013 |
| WO | WO 93/24587 A1 | 12/1993 |
| WO | WO 98/10042 A1 | 3/1998 |
| WO | WO 2012/026303 A1 | 3/2012 |

OTHER PUBLICATIONS

International Bureau of WIPO, International Preliminary Report on Patentability in International Patent Application No. PCT/JP2015/051106, (dated Aug. 4, 2016) 2 pp.
Japan Patent Office, International Search Report in International Patent Application No. PCT/JP2015/051106, dated Feb. 10, 2015, 2 pp.
European Patent Office, Extended European Search Report in European Patent Application No. 15740721.4, (dated Jan. 27, 2017) 10 pp.
U.S. Appl. No. 15/025,855, filed Mar. 29, 2016.
U.S. Appl. No. 15/114,290, filed Jul. 26, 2016.
U.S. Appl. No. 15/116,110, filed Aug. 2, 2016.
U.S. Appl. No. 15/304,775, filed Oct. 17, 2016.
U.S. Appl. No. 15/305,568, filed Oct. 20, 2016.
U.S. Appl. No. 15/310,398, filed Nov. 10, 2016.

* cited by examiner

*Primary Examiner* — John Hardee
(74) *Attorney, Agent, or Firm* — Leydig, Voit & Mayer, Ltd.

(57) ABSTRACT

The present invention provides a working fluid composition for a refrigerating machine containing: a refrigerating machine oil containing, as a base oil, a mixed ester of (A) a complex ester synthesized from a polyhydric alcohol such as neopentyl glycol, a polybasic acid having 6 to 12 carbon atoms, a monohydric alcohol having 4 to 18 carbon atoms and the like, and (B) a polyol ester synthesized from a polyhydric alcohol such as neopentyl glycol and a monocarboxylic fatty acid having 4 to 18 carbon atoms, in a mass ratio of (A) the complex ester/(B) the polyol ester of 5/95 to 95/5; and a refrigerant such as carbon dioxide.

9 Claims, No Drawings

WORKING FLUID COMPOSITION FOR REFRIGERATING MACHINE AND REFRIGERATING MACHINE OIL

CROSS-REFERENCE TO RELATED APPLICATIONS

This patent application is the U.S. national phase of International Application No. PCT/JP2015/051106, filed on Jan. 16, 2015, which claims the benefit of Japanese Patent Application No. 2014-008589, filed Jan. 21, 2014, the disclosures of which are incorporated herein by reference in their entireties for all purposes.

TECHNICAL FIELD

The present invention relates to a working fluid composition for a refrigerating machine and a refrigerating machine oil. It is noted that the term "refrigerating machine" herein embraces a vehicle air conditioner, a dehumidifier, a refrigerator, a refrigerated warehouse, a cooling apparatus used in a vending machine, a showcase, a chemical plant or the like, a household air conditioner, a package air conditioner, a heat pump for hot water supply, and the like.

BACKGROUND ART

In the field of refrigeration and air conditioning, 1,1,1,2-tetrafluoroethane (R134a) that is a hydrofluorocarbon (HFC) and R410A that is a mixed refrigerant of difluoromethane (R32) and pentafluoroethane (R125) in a mass ratio of 1/1 are currently widely used as refrigerants for a refrigerator, a vehicle air conditioner, a room air conditioner, industrial refrigerating machine, and the like.

Patent Literature 1 discloses, as a refrigerating machine oil for an R32 refrigerant, an ester synthesized from trimethylolpropane and/or neopentyl glycol and a specific dibasic acid, and a monohydric alcohol or a monocarboxylic fatty acid. Besides, Patent Literature 2 discloses, for use together with a single R32 refrigerant or a mixed refrigerant containing 50% by mass or more of R32, an ester-based refrigerating machine oil containing 20 to 60% by mass of a monobasic fatty acid having 5 or less carbon atoms, using a branched fatty acid as a fatty acid having 8 or more carbon atoms, and having a viscosity at 40° C. of 32 to 100 cst.

Furthermore, with respect to a base oil for a general industrial lubricating oil, Patent Literature 3 discloses a lubricating oil base oil consisting of a synthetic ester obtained by reacting an alcohol component containing 90% by mass or more of trimethylolpropane with a carboxylic acid component that contains a monocarboxylic fatty acid having 8 to 12 carbon atoms and adipic acid, and further contains, in a total amount of 90% by mass or more, caprylic acid and/or a monocarboxylic fatty acid having 8 to 12 carbon atoms containing 90% by mass or more of caprylic acid in total, and adipic acid.

CITATION LIST

Patent Literature

Patent Literature 1: Japanese Unexamined Patent Publication No. 2011-184536
Patent Literature 2: Japanese Unexamined Patent Publication No. 2002-129179
Patent Literature 3: Japanese Unexamined Patent Publication No. 2012-102235

SUMMARY OF INVENTION

Technical Problem

There is a trend, however, that a load condition in a sliding portion of a refrigerating apparatus becomes more severe in the future, and therefore, it is significant to attain both antiwear property and stability in a case where a prescribed refrigerant coexists and is dissolved in a refrigerating machine oil.

The present invention has been accomplished in consideration of the above-described problem, and an object is to provide a working fluid composition for a refrigerating machine and a refrigerating machine oil that can retain a thick oil film, have a good antiwear effect, and are excellent in stability even under a severe lubrication condition caused when a refrigerant coexists and is dissolved in the refrigerating machine oil.

Solution to Problem

The present inventors have found that a working fluid containing a refrigerating machine oil using, as a base oil, an ester containing a complex ester synthesized from a specific polyhydric alcohol, a polybasic acid, and a monohydric alcohol or a monocarboxylic fatty acid, and a polyol ester synthesized from a specific polyhydric alcohol and a monocarboxylic fatty acid, and a prescribed refrigerant can attain both antiwear property and stability, and as a result, accomplished the present invention.

Specifically, the present invention provides a working fluid composition for a refrigerating machine according to [1] to [6] below, and a refrigerating machine oil according to [7] below.

[1] A working fluid composition for a refrigerating machine, comprising: a refrigerating machine oil comprising, as a base oil, a mixed ester of (A) a complex ester synthesized from a polyhydric alcohol comprising at least one selected from neopentyl glycol, trimethylolpropane and pentaerythritol, at least one selected from polybasic acids having 6 to 12 carbon atoms, and at least one selected from monohydric alcohols having 4 to 18 carbon atoms and monocarboxylic fatty acids having 4 to 18 carbon atoms, and (B) a polyol ester synthesized from at least one polyhydric alcohol selected from neopentyl glycol, trimethylolpropane, pentaerythritol and dipentaerythritol, and at least one selected from monocarboxylic fatty acids having 4 to 18 carbon atoms, in a mass ratio of (A) the complex ester/(B) the polyol ester of 5/95 to 95/5; and a refrigerant selected from carbon dioxide, 1,1,1,2-tetrafluoroethane, a mixture of difluoromethane and pentafluoroethane, a mixture of difluoromethane, pentafluoroethane and 1,1,1,2-tetrafluoroethane, and a mixture of pentafluoroethane, 1,1,1,2-tetrafluoroethane and 1,1,1-trifluoroethane.

[2] The working fluid composition for a refrigerating machine according to [1], wherein the polyhydric alcohol constituting (A) the complex ester further comprises a dihydric alcohol having 2 to 10 carbon atoms except neopentyl glycol.

[3] The working fluid composition for a refrigerating machine according to [1] or [2], wherein the polyhydric alcohol constituting (A) the complex ester comprises at least one selected from neopentyl glycol and trimethylolpropane.

[4] The working fluid composition for a refrigerating machine according to any one of [1] to [3], wherein the polybasic acid constituting (A) the complex ester is at least one selected from adipic acid and sebacic acid.

[5] The working fluid composition for a refrigerating machine according to any one of [1] to [4], wherein the monohydric alcohol constituting (A) the complex ester is a monohydric alcohol having 8 to 10 carbon atoms.

[6] The working fluid composition for a refrigerating machine according to any one of [1] to [5], wherein (B) the polyol ester is an ester synthesized from at least one selected from neopentyl glycol and pentaerythritol, and at least one selected from monocarboxylic fatty acids having 4 to 9 carbon atoms.

[7] The working fluid composition for a refrigerating machine according to any one of [1] to [6], wherein (B) the polyol ester is an ester synthesized from pentaerythritol, and a mixed fatty acid of a branched fatty acid having 4 carbon atoms and 3,5,5-trimethylhexanoic acid.

[8] A refrigerating machine oil, comprising, as a base oil, a mixed ester of (A) a complex ester synthesized from a polyhydric alcohol comprising at least one selected from neopentyl glycol, trimethylolpropane and pentaerythritol, at least one selected from polybasic acids having 6 to 12 carbon atoms, and at least one selected from monohydric alcohols having 4 to 18 carbon atoms and monocarboxylic fatty acids having 4 to 18 carbon atoms, and (B) a polyol ester synthesized from at least one polyhydric alcohol selected from neopentyl glycol, trimethylolpropane, pentaerythritol and dipentaerythritol, and at least one selected from monocarboxylic fatty acids having 4 to 18 carbon atoms, in a mass ratio of (A) the complex ester/(B) the polyol ester of 5/95 to 95/5, wherein the refrigerating machine oil is used with a refrigerant selected from carbon dioxide, 1,1,1,2-tetrafluoroethane, a mixture of difluoromethane and pentafluoroethane, a mixture of difluoromethane, pentafluoroethane and 1,1,1,2-tetrafluoroethane, and a mixture of pentafluoroethane, 1,1,1,2-tetrafluoroethane and 1,1,1-trifluoroethane.

Advantageous Effects of Invention

According to the present invention, a working fluid composition for a refrigerating machine and a refrigerating machine oil that can retain a thick oil film, have a good antiwear effect, and are excellent in stability even under a severe lubrication condition caused when a refrigerant coexists and is dissolved in the refrigerating machine oil can be provided.

DESCRIPTION OF EMBODIMENT

A preferred embodiment of the present invention is described in detail.

A refrigerating machine oil according to the present embodiment contains, as a base oil, a mixed ester of (A) a complex ester synthesized from a polyhydric alcohol containing at least one selected from neopentyl glycol, trimethylolpropane and pentaerythritol, at least one selected from polybasic acids having 6 to 12 carbon atoms, and at least one selected from monohydric alcohols having 4 to 18 carbon atoms and monocarboxylic fatty acids having 4 to 18 carbon atoms; and (B) a polyol ester synthesized from at least one polyhydric alcohol selected from neopentyl glycol, trimethylolpropane, pentaerythritol and dipentaerythritol, and at least one selected from monocarboxylic fatty acids having 4 to 18 carbon atoms, in a mass ratio of (A) the complex ester/(B) the polyol ester of 5/95 to 95/5, and is used together with a refrigerant selected from carbon dioxide, 1,1,1,2-tetrafluoroethane, a mixture of difluoromethane and pentafluoroethane, a mixture of difluoromethane, pentafluoroethane and 1,1,1,2-tetrafluoroethane, and a mixture of pentafluoroethane, 1,1,1,2-tetrafluoroethane and 1,1,1-trifluoroethane.

A working fluid composition for a refrigerating machine according to the present embodiment contains: a refrigerating machine oil, containing, as a base oil, a mixed ester of (A) a complex ester synthesized from a polyhydric alcohol containing at least one selected from neopentyl glycol, trimethylolpropane and pentaerythritol, at least one selected from polybasic acids having 6 to 12 carbon atoms, and at least one selected from monohydric alcohols having 4 to 18 carbon atoms and monocarboxylic fatty acids having 4 to 18 carbon atoms; and (B) a polyol ester synthesized from at least one polyhydric alcohol selected from neopentyl glycol, trimethylolpropane, pentaerythritol and dipentaerythritol, and at least one selected from monocarboxylic fatty acids having 4 to 18 carbon atoms, in a mass ratio of (A) the complex ester/(B) the polyol ester of 5/95 to 95/5; and a refrigerant selected from carbon dioxide, 1,1,1,2-tetrafluoroethane, a mixture of difluoromethane and pentafluoroethane, a mixture of difluoromethane, pentafluoroethane and 1,1,1,2-tetrafluoroethane, and a mixture of pentafluoroethane, 1,1,1,2-tetrafluoroethane and 1,1,1-trifluoroethane.

In one aspect, the working fluid composition for a refrigerating machine of the present embodiment contains the refrigerating machine oil of the present embodiment; and a refrigerant selected from carbon dioxide, 1,1,1,2-tetrafluoroethane, a mixture of difluoromethane and pentafluoroethane, a mixture of difluoromethane, pentafluoroethane and 1,1,1,2-tetrafluoroethane, and a mixture of pentafluoroethane, 1,1,1,2-tetrafluoroethane and 1,1,1-trifluoroethane.

The aforementioned complex ester has a lower compatibility with a refrigerant because the refrigerant is difficult to dissolve therein as compared with a conventional refrigerating machine oil, but can retain an oil film thick. Besides, the aforementioned polyol ester is good in the compatibility with a refrigerant. In the present embodiment, since the complex ester and the polyol ester thus having different characteristics (of, particularly, a refrigerant solubility) are blended, the oil film can be made thick in coexistence of a refrigerant, and accordingly, the antiwear property of the working fluid can be improved.

Incidentally, a complex ester has a high molecular weight and hence is an ester with a high viscosity. Therefore, a complex ester is difficult to be compatible with a refrigerant and is not suitably used singly as a base oil of a refrigerating machine oil requiring compatibility with a refrigerant from the viewpoint of oil return to a compressor. As one characteristic of the present embodiment, it is possible to make the characteristics balanced by mixing the complex ester with an oil having a good compatibility with a refrigerant, such as the above-described polyol ester.

The kinematic viscosity at 40° C. of the complex ester is preferably 20 mm$^2$/s or more, more preferably 40 mm$^2$/s or more and further preferably 50 mm$^2$/s or more, and preferably 500 mm$^2$/s or less, more preferably 400 mm$^2$/s or less, further preferably 200 mm$^2$/s or less and particularly preferably 90 mm$^2$/s or less. The kinematic viscosity at 100° C. of the complex ester is preferably 5 mm$^2$/s or more, more preferably 6 mm$^2$/s or more and further preferably 7 mm$^2$/s or more, and preferably 30 mm$^2$/s or less, more preferably 20 mm$^2$/s or less and further preferably 15 mm$^2$/s or less. The viscosity index of the complex ester is preferably 100 or more and more preferably 115 or more, and preferably 180 or less. The kinematic viscosity and the viscosity index herein mean a kinematic viscosity and a viscosity index measured in accordance with JIS K2283.

Examples of a synthesizing method for the complex ester include:

(a) a method in which a molar ratio between a polyhydric alcohol and a polybasic acid is adjusted for synthesizing an ester intermediate in which some of carboxyl groups of the polybasic acid remain therein without being esterified, and the remaining carboxyl groups are esterified by a monohydric alcohol, and (b) a method in which a molar ratio between a polyhydric alcohol and a polybasic acid is adjusted for synthesizing an ester intermediate in which some of hydroxyl groups of the polyhydric alcohol remain therein without being esterified, and the remaining hydroxyl groups are esterified by a monocarboxylic fatty acid.

A complex ester obtained by the above-described method (b) is rather inferior in the stability to a complex ester obtained by the above-described method (a) because a comparatively strong acid is produced if it is hydrolyzed when used as a refrigerating machine oil. The complex ester of the present embodiment is preferably a complex ester with higher stability obtained by the above-described method (a).

As the polyhydric alcohol constituting the complex ester, at least one selected from neopentyl glycol, trimethylolpropane and pentaerythritol is used. For attaining a suitable viscosity as a base oil to attain a good low temperature characteristic, the polyhydric alcohol is preferably neopentyl glycol or trimethylolpropane. Since the viscosity can be widely adjusted, neopentyl glycol is more preferably used as the polyhydric alcohol.

Since the lubricity can be further improved, the polyhydric alcohol constituting the complex ester preferably further contains, in addition to at least one selected from neopentyl glycol, trimethylolpropane and pentaerythritol, a dihydric alcohol having 2 to 10 carbon atoms except neopentyl glycol. Examples of the dihydric alcohol having 2 to 10 carbon atoms except neopentyl glycol include ethylene glycol, propanediol, butanediol, pentanediol, hexanediol, 2-methyl-1,3-propanediol, 3-methyl-1,5-pentanediol, and 2,2-diethyl-1,3-pentanediol. Among these, butanediol that can attain good characteristic balance of a resultant synthesized base oil is preferred. Examples of the butanediol include 1,2-butanediol, 1,3-butanediol, 1,4-butanediol and 2,3-butanediol. Among these, 1,3-butanediol and 1,4-butanediol are more preferred because good characteristics can be thus attained. The dihydric alcohol having 2 to 10 carbon atoms except neopentyl glycol is used in an amount of preferably 1.2 mol or less, more preferably 0.8 mol or less, and further preferably 0.4 mol or less based on 1 mol of the polyhydric alcohol selected from neopentyl glycol, trimethylolpropane and pentaerythritol.

The polybasic acid constituting the complex ester is at least one selected from polybasic acids having 6 to 12 carbon atoms. Examples of such polybasic acids include adipic acid, pimelic acid, suberic acid, azelaic acid, sebacic acid, phthalic acid and trimellitic acid. Among these, from the viewpoint of good characteristic balance of a resultant synthesized ester and easy availability, adipic acid and sebacic acid are preferred, and adipic acid is more preferred. This polybasic acid is used in an amount of preferably 0.4 mol or more, more preferably 0.5 mol or more, and further preferably 0.6 mol or more, and preferably 4 mol or less, more preferably 3 mol or less and further preferably 2.5 mol or less based on 1 mol of the polyhydric alcohol selected from neopentyl glycol, trimethylolpropane and pentaerythritol.

If some of carboxyl groups of the polybasic acid remain, without being esterified, in the complex ester intermediate produced through the reaction between the polyhydric alcohol and the polybasic acid, the carboxyl groups are esterified by at least one selected from monohydric alcohols having 4 to 18 carbon atoms. Examples of the monohydric alcohols having 4 to 18 carbon atoms include straight or branched butanol, straight or branched pentanol, straight or branched hexanol, straight or branched heptanol, straight or branched octanol, straight or branched nonanol, straight or branched decanol, straight or branched dodecanol, and an aliphatic alcohol such as oleyl alcohol. From the viewpoint of the characteristic balance, such monohydric alcohols having 4 to 18 carbon atoms are preferably monohydric alcohols having 6 to 10 carbon atoms, and more preferably monohydric alcohols having 8 to 10 carbon atoms. Among these, 2-ethylhexanol and 3,5,5-trimethylhexanol are further preferred since the low temperature characteristic of the resultant synthesized complex ester can be thus good.

If some of hydroxyl groups of the polyhydric alcohol remain, without being esterified, in the complex ester intermediate produced through the reaction between the polyhydric alcohol and the polybasic acid, the hydroxyl groups are esterified by at least one selected from monocarboxylic fatty acids having 4 to 18 carbon atoms. Examples of the monocarboxylic fatty acids having 4 to 18 carbon atoms include straight or branched butanoic acid, straight or branched pentanoic acid, straight or branched hexanoic acid, straight or branched heptanoic acid, straight or branched octanoic acid, straight or branched nonanoic acid, straight or branched decanoic acid, straight or branched dodecanoic acid, and oleic acid. Such monocarboxylic fatty acids having 4 to 18 carbon atoms are preferably monocarboxylic fatty acids having 8 to 10 carbon atoms, and are more preferably 2-ethylhexanoic acid and 3,5,5-trimethylhexanoic acid from the viewpoint of the low temperature characteristic.

The polyol ester of the present embodiment is a polyol ester synthesized from at least one polyhydric alcohol selected from neopentyl glycol, trimethylolpropane, pentaerythritol and dipentaerythritol, and at least one selected from monocarboxylic fatty acids having 4 to 18 carbon atoms.

As the polyhydric alcohol constituting the polyol ester, trimethylolpropane and pentaerythritol are preferred, and pentaerythritol is more preferred from the viewpoint of the characteristic balance.

Examples of the monocarboxylic fatty acids having 4 to 18 carbon atoms constituting the polyol ester include straight or branched butanoic acid, straight or branched pentanoic acid, straight or branched hexanoic acid, straight or branched heptanoic acid, straight or branched octanoic acid, straight or branched nonanoic acid, straight or branched decanoic acid, straight or branched dodecanoic acid, and oleic acid. From the viewpoint of the low temperature characteristic, such monocarboxylic fatty acids having 4 to 18 carbon atoms are preferably monocarboxylic fatty acids having 4 to 9 carbon atoms, and more preferably branched butanoic acid, branched pentanoic acid, branched hexanoic acid, branched heptanoic acid, 2-ethylhexanoic acid and 3,5,5-trimethylhexanoic acid.

As the polyol ester of the present embodiment, from the viewpoint of the compatibility with the refrigerant, a polyol ester of pentaerythritol and a mixed fatty acid of two or more selected from branched fatty acids having 4 to 9 carbon atoms is preferred, a polyol ester of pentaerythritol and a mixed fatty acid of a branched fatty acid having 4 carbon atoms and a branched fatty acid having 9 carbon atoms is more preferred, and a polyol ester of pentaerythritol and a mixed fatty acid of a branched fatty acid having 4 carbon atoms and 3,5,5-trimethylhexanoic acid is further preferred.

The kinematic viscosity at 40° C. of the polyol ester is preferably 5 mm$^2$/s or more, more preferably 20 mm$^2$/s or more and further preferably 30 mm$^2$/s or more, and preferably 300 mm$^2$/s or less, more preferably 200 mm$^2$/s or less and further preferably 60 mm$^2$/s. The kinematic viscosity at 100° C. of the polyol ester is preferably 1 mm$^2$/s or more, more preferably 2 mm$^2$/s or more and further preferably 3 mm$^2$/s or more, and preferably 30 mm$^2$/s or less, more preferably 15 mm$^2$/s or less and further preferably 7 mm$^2$/s or more. The viscosity index of the polyol ester is preferably 70 or more, more preferably 80 or more and further preferably 90, and preferably 150 or less.

In the working fluid composition for a refrigerating machine, the mass ratio between a content of (A) the complex ester and (B) a content of the polyol ester (the content of (A)/the content of (B)) is 5/95 to 95/5, and is preferably 20/80 to 80/20, and more preferably 30/70 to 70/30 for further utilizing the characteristics of the respective esters.

The pour point of the refrigerating machine oil is preferably −10° C. or less, and more preferably −20° C. or less. The pour point herein means a pour point measured in accordance with JIS K2269.

The acid value of the refrigerating machine oil can be preferably 0.1 mgKOH/g or less, and more preferably 0.05 mgKOH/g or less in order to prevent corrosion of a metal used in a refrigerating machine or piping and to suppress degradation of the refrigerating machine oil itself. The acid value herein means an acid value measured in accordance with JIS K2501 "determination method of acid value".

The flash point of the refrigerating machine oil is preferably 120° C. or more, and more preferably 200° C. or more. The flash point herein means a flash point measured in accordance with JIS K2265-4.

The moisture content of the refrigerating machine oil is preferably 200 ppm or less, more preferably 100 ppm or less, and further preferably 50 ppm or less. In particular, if it is used in a hermetic refrigerating machine, the moisture content is required to be small from the viewpoint of the stability and electric insulation of the refrigerating machine oil.

The refrigerating machine oil may further contain, in addition to the complex ester and the polyol ester described above, another base oil such as a mineral base oil or a synthetic base oil. The total content of the above-described complex ester and the above-described polyol ester is preferably 80% by mass or more, and more preferably 95% by mass or more based on the total amount of the refrigerating machine oil.

The refrigerating machine oil can further contain various additives for further improving the antiwear property.

Suitable examples of the additives include phosphates. Among the phosphates, triphenyl phosphate (TPP) and tricresyl phosphate (TCP) are preferred. Suitable examples of a sulfur additive include sulfide compounds. There are a large number of sulfide compounds, among which a monosulfide compound is preferred because the stability of the refrigerating machine oil can be attained and quality change of copper largely used inside a refrigerating machine can be inhibited.

The refrigerating machine oil can contain, in addition to the aforementioned additives, additives conventionally used in a lubricating oil, in a range not impairing the object of the present invention, for further improving the performance. Examples of such additives include an antioxidant, a friction modifier, an antiwear agent, an extreme pressure agent, a rust inhibitor, a metal deactivator and an antifoaming agent.

Examples of the antioxidant include a phenol-based compound such as di-tert-butyl-p-cresol, and an amine-based compound such as alkyldiphenylamine. In particular, the refrigerating machine oil contains a phenol-based compound as an antioxidant in an amount of preferably 0.02% by mass or more and 0.5% by mass or less based on the total amount of the refrigerating machine oil.

Examples of the friction modifier include aliphatic amines, aliphatic amides, aliphatic imides, alcohols, esters, phosphate amine salts and phosphite amine salts. An example of the anti-wear agent includes zinc dialkyldithiophosphate. Examples of the extreme pressure agent include olefin sulfide and sulfurized fats and oils. Examples of the rust inhibitor include esters or partial esters of alkenyl succinic acid. Examples of the metal deactivator include benzotriazole and benzotriazole derivatives. Examples of the antifoaming agent include silicone compounds and polyester compounds.

The refrigerant used together with the refrigerating machine oil of the present embodiment and the refrigerant contained in the working fluid composition for a refrigerating machine of the present embodiment are selected from carbon dioxide, 1,1,1,2-tetrafluoroethane (R134a), a mixture of difluoromethane (R32) and pentafluoroethane (R125), a mixture of difluoromethane (R32), pentafluoroethane (R125) and 1,1,1,2-tetrafluoroethane (R134a), and a mixture of pentafluoroethane (R125), 1,1,1,2-tetrafluoroethane (R134a) and 1,1,1-trifluoroethane (R143a). Such a refrigerant may be one, or two or more selected from the above. Besides, as such a refrigerant, another refrigerant may be used together in addition to the refrigerant selected from the above. The content of the refrigerant selected from the above is preferably 60 to 100% by mass and more preferably 80 to 100% by mass based on the total amount of the refrigerant.

In the mixture of difluoromethane (R32) and pentafluoroethane (R125), a mass ratio (R32/R125) can be set to, for example, 40-70/60-30. In particular, a mixture having a mass ratio (R32/R125) of 60/40, a mixture (R410A) having a mass ratio of 50/50, and a mixture (R410B) having a mass ratio of 45/55 are suitably used.

In the mixture of difluoromethane (R32), pentafluoroethane (R125) and 1,1,1,2-tetrafluoroethane (R134a), a mass ratio (R32/R125/R134a) can be set to, for example, 15-35/5-40/40-70. In particular, a mixture having a mass ratio (R32/R125/R134a) of 30/10/60, a mixture (R407C) having a mass ratio of 23/25/52, and a mixture (R407E) having a mass ratio of 25/15/60 are suitably used.

In the mixture of pentafluoroethane (R125), 1,1,1,2-tetrafluoroethane (R134a) and 1,1,1-trifluoroethane (R143a), a mass ratio (R125/R134a/R143a) can be set to, for example, 35-55/1-15/40-60. In particular, a mixture (R404A) having a mass ratio (R125/R134a/R143a) of 44/4/52 is suitably used.

The content of the refrigerating machine oil in the working fluid composition for a refrigerating machine is not especially limited, and is preferably 1 part by mass or more and more preferably 2 parts by mass or more, and preferably 500 parts by mass or less and more preferably 400 parts by mass or less based on 100 parts by mass of the refrigerant.

EXAMPLES

The present invention is described more specifically on the basis of Examples and Comparative Examples, and it is noted that the present invention is not limited to the following Examples at all.

First, base oils 1 to 8 respectively having compositions shown in Tables 1 and 2 were prepared by using the following base materials.

[A] Complex Ester (A1) An ester (having a kinematic viscosity at 40° C. of 67.8 mm²/s, a kinetic viscosity at 100° C. of 10.6 mm²/s, and a viscosity index of 145) obtained by reacting an ester intermediate which resulted from a reaction of neopentyl glycol (1 mol) and 1,4-butanediol (0.3 mol) with adipic acid (2.4 mol) with 3,5,5-trimethylhexanol (2.5 mol), and distilling off a remaining unreacted substance.

(A2) An ester (having a kinematic viscosity at 40° C. of 145.8 mm²/s, a kinetic viscosity at 100° C. of 17.9 mm²/s, and a viscosity index of 136) obtained by reacting an ester intermediate which resulted from a reaction of neopentyl glycol (1 mol) and 1,4-butanediol (0.2 mol) with adipic acid (1.9 mol) with 3,5,5-trimethylhexanol (1.1 mol) and distilling off a remaining unreacted substance.

(A3) An ester (having a kinematic viscosity at 40° C. of 67.6 mm²/s, a kinetic viscosity at 100° C. of 10.6 mm²/s, and a viscosity index of 145) obtained by reacting an ester intermediate which resulted from a reaction of neopentyl glycol (1 mol) and 1,4-butanediol (0.3 mol) with adipic acid (2.3 mol) with 2-ethylhexanol (2.3 mol) and distilling off a remaining unreacted substance.

(A4) An ester (having a kinematic viscosity at 40° C. of 68.2 mm²/s, a kinematic viscosity at 100° C. of 10.4 mm²/s, and a viscosity index of 139) obtained by reacting an ester intermediate which resulted from a reaction of neopentyl glycol (1 mol) with adipic acid (2.5 mol) with 3,7-dimethyloctanol (2.6 mol) and distilling off a remaining unreacted substance.

(A5) An ester (having a kinematic viscosity at 40° C. of 300 mm²/s, a kinematic viscosity at 100° C. of 26.2 mm²/s, and a viscosity index of 115) obtained by reacting an ester intermediate which resulted from a reaction of neopentyl glycol (1 mol) with adipic acid (0.8 mol) with 3,5,5-trimethylhexanoic acid (0.3 mol) and distilling off a remaining unreacted substance.

[B] Polyol Ester (B1) An ester (having a kinematic viscosity at 40° C. of 69.4 mm²/s, a kinematic viscosity at 100° C. of 8.2 mm²/s, and a viscosity index of 82) of pentaerythritol and a mixed acid of 2-methylpropanoic acid and 3,5,5-trimethylhexanoic acid (in a molar ratio of 35:65).

(B2) An ester (having a kinematic viscosity at 40° C. of 46.2 mm²/s, a kinematic viscosity at 100° C. of 6.3 mm²/s, and a viscosity index of 77) of pentaerythritol and a mixed acid of 2-methylpropanoic acid and 3,5,5-trimethylhexanoic acid (in a molar ratio of 60:40).

(B3) An ester (having a kinematic viscosity at 40° C. of 68.4 mm²/s, a kinematic viscosity at 100° C. of 8.4 mm²/s, and a viscosity index of 91) of pentaerythritol and a mixed acid of 2-ethylhexanoic acid and 3,5,5-trimethylhexanoic acid (in a molecular ratio of 45:55).

(B4) An ester (having a kinematic viscosity at 40° C. of 222.5 mm²/s, a kinematic viscosity at 100° C. of 18.8 mm²/s, and a viscosity index of 94) of dipentaerythritol and a mixed acid of 2-ethylhexanoic acid and 3,5,5-trimethylhexanoic acid (in a molar ratio of 50:50).

(B5) An ester (having a kinematic viscosity at 40° C. of 7.5 mm²/s, a kinematic viscosity at 100° C. of 2.0 mm²/s, and a viscosity index of 31) of neopentyl glycol and 2-ethylhexanoic acid.

(B6) An ester (having a kinematic viscosity at 40° C. of 31.4 mm²/s, a kinematic viscosity at 100° C. of 5.6 mm²/s, and a viscosity index of 118) of pentaerythritol and a mixed acid of normal pentanoic acid and 3,5,5-trimethylhexanoic acid (in a molar ratio of 65:35).

[Hydrocarbon Oil]

(C1) Poly α-olefin (PAO) (having a kinematic viscosity at 40° C. of 34.0 mm²/s, a kinematic viscosity at 100° C. of 6.9 mm²/s, and a viscosity index of 168)

(C2) Poly α-olefin (PAO) (having a kinematic viscosity at 40° C. of 68.0 mm²/s, a kinematic viscosity at 100° C. of 9.9 mm²/s, and a viscosity index of 128)

In these base oils, synthesis reactions of the esters of [A] and [B] are performed without using a catalyst and a solvent, and a slight amount of impurities were removed by an adsorption treatment (a clay treatment) in the final process. Incidentally, the kinematic viscosities and the viscosity indexes were measured and calculated in accordance with JIS K2283.

TABLE 1

| Composition (mass %) | | Base Oil 1 | Base Oil 2 | Base Oil 3 | Base Oil 4 | Base Oil 5 |
|---|---|---|---|---|---|---|
| Composition (mass %) | A1 | — | 30 | 40 | — | 30 |
| | A2 | 20 | — | — | 20 | — |
| | A3 | — | — | — | — | — |
| | A4 | — | — | — | — | — |
| | A5 | — | — | — | — | — |
| | B1 | — | 70 | 60 | 80 | 20 |
| | B2 | 57 | — | — | — | — |
| | B3 | — | — | — | — | — |
| | B4 | — | — | — | — | — |
| | B5 | 23 | — | — | — | 50 |

TABLE 2

| Composition (mass %) | | Base Oil 6 | Base Oil 7 | Base Oil 8 | Base Oil 9 | Base Oil 10 | Base Oil 11 |
|---|---|---|---|---|---|---|---|
| Composition (mass %) | A1 | 20 | 40 | — | — | — | — |
| | A2 | — | — | 20 | — | — | — |
| | A3 | — | — | — | 40 | — | — |
| | A4 | — | — | — | — | 40 | — |
| | A5 | — | — | — | — | — | 20 |
| | B1 | — | — | — | — | — | — |
| | B2 | 40 | — | — | — | — | 80 |
| | B3 | 40 | 60 | 70 | 60 | — | — |
| | B4 | — | — | 10 | — | 60 | — |
| | B5 | — | — | — | — | — | — |

Next, a refrigerating machine oil was prepared by mixing di-tert-butyl-p-cresol (DBPC) serving as an antioxidant in an amount of 0.1% by mass with each of base oils shown in Tables 3 to 17. It is noted that base oils C1, C2 and B6 shown in Tables 3 to 17 refer to base oils respectively consisting of the above-described base materials C1, C2 and B6.

Each of the refrigerating machine oils of Examples and Comparative Examples was subjected to a antiwear property test and a stability test as follows. Evaluation refrigerants used in the antiwear property test and the stability test are shown in Tables 3 to 17. The details of the respective evaluation refrigerants are as follows:

R407C: a mixture of difluoromethane/pentafluoroethane/1,1,1,2-tetrafluoroethane (in a mass ratio of 23/25/52)

$CO_2$: carbon dioxide

R404A: a mixture of pentafluoroethane/1,1,1,2-tetrafluoroethane/1,1,1-trifluoroethane (in a mass ratio of 44/4/52)

R134a: 1,1,1,2-tetrafluoroethane

R410A: a mixture of difluoromethane/pentafluoroethane (in a mass ratio of 50/50)

(Antiwear Property Test)

A high pressure ambience friction and wear tester (employing a rotating/sliding method using a rotating vane member and a fixed disk member) manufactured by Shinko Engineering Co., Ltd., which can attain a refrigerant atmosphere similar to that in an actual compressor, was used for performing the antiwear property test. As test conditions, any of the following antiwear property tests (1) to (5) was employed in accordance with the type of evaluation refrigerant:

Antiwear property test (1): R407C was used as a refrigerant, and an inside pressure of a test vessel was set to 1.6 MPa.

Antiwear property test (2): $CO_2$ was used as a refrigerant, and an inside pressure of a test vessel was set to 1.6 MPa.

Antiwear property test (3): R404A was used as a refrigerant, and an inside pressure of a test vessel was set to 1.6 MPa.

Antiwear property test (4): R134a was used as a refrigerant, and an inside pressure of a test vessel was set to 1.6 MPa.

Antiwear property test (5): R410A was used as a refrigerant, and an inside pressure of a test vessel was set to 3.1 MPa.

In all of the antiwear property tests (1) to (5), common conditions of an oil amount of 600 ml, a test temperature of 110° C., a rotation speed of 500 rpm, an applied load of 80 kgf and a test time of 1 hour were employed. Similarly, SKH-51 and FC250 were commonly used respectively as the vane member and the disk member. It is noted that the evaluation of the antiwear property was performed in accordance with a wear depth of the vane member because the wear amount of the disk member was extremely small. The obtained results are shown in Tables 3 to 17.

(Stability Test)

The stability test was performed in accordance with JIS K2211-09 (autoclave test) by weighing out, into an autoclave, 80 g of a sample oil having a moisture content adjusted to 100 ppm, enclosing a catalyst (an iron, copper or aluminum wire having an outer diameter of 1.6 mm and a length of 50 mm) and 20 g of the evaluation refrigerant, and then heating the resultant to 150° C. to measure the appearance and the acid value (JIS C2101) of the sample oil after 150 hours. The obtained results are shown in Tables 3 to 17.

TABLE 3

| | | Example 1-1 | Example 1-2 | Example 1-3 | Example 1-4 | Example 1-5 |
|---|---|---|---|---|---|---|
| Evaluation Type of | Refrigerant Base Oil | R407C Base Oil 1 | R407C Base Oil 2 | R407C Base Oil 3 | R407C Base Oil 4 | R407C Base Oil 5 |
| Antiwear property Test | Wear Depth of Vane (μm) | 6.8 | 6.6 | 6.2 | 6.5 | 6.4 |
| Stability Test | Appearance | no deposition | no deposition | no deposition | no deposition | no deposition |
| | Acid Value (mgKOH/g) | 0.02 | 0.02 | 0.02 | 0.02 | 0.01 |

TABLE 4

| | | Example 1-6 | Example 1-7 | Example 1-8 | Example 1-9 | Example 1-10 |
|---|---|---|---|---|---|---|
| Evaluation Type of | Refrigerant Base Oil | R407C Base Oil 6 | R407C Base Oil 7 | R407C Base Oil 8 | R407C Base Oil 9 | R407C Base Oil 10 |
| Antiwear property Test | Wear Depth of Vane (μm) | 6.3 | 6.1 | 5.9 | 5.8 | 5.9 |
| Stability Test | Appearance | no deposition | no deposition | no deposition | no deposition | no deposition |
| | Acid Value (mgKOH/g) | 0.03 | 0.02 | 0.01 | 0.02 | 0.01 |

TABLE 5

| | | Example 1-11 | Comparative Example 1-1 | Comparative Example 1-2 | Comparative Example 1-3 |
|---|---|---|---|---|---|
| Evaluation Type of | Refrigerant Base Oil | R407C Base Oil 11 | R407C Base Oil C1 | R407C Base Oil C2 | R407C Base Oil B6 |
| Antiwear property Test | Wear Depth of Vane (μm) | 7.2 | 8.9 | 8.8 | 9.3 |
| Stability Test | Appearance | no deposition | no deposition | no deposition | no deposition |
| | Acid Value (mgKOH/g) | 0.02 | 0.01 | 0.01 | 0.11 |

TABLE 6

|  |  | Example 2-1 | Example 2-2 | Example 2-3 | Example 2-4 | Example 2-5 |
| --- | --- | --- | --- | --- | --- | --- |
| Evaluation Type of Base Oil | Refrigerant Base Oil | $CO_2$ Base Oil 1 | $CO_2$ Base Oil 2 | $CO_2$ Base Oil 3 | $CO_2$ Base Oil 4 | $CO_2$ Base Oil 5 |
| Antiwear property Test | Wear Depth of Vane (μm) | 8.1 | 7.9 | 7.3 | 7.1 | 7.2 |
| Stability Test | Appearance | no deposition | no deposition | no deposition | no deposition | no deposition |
|  | Acid Value (mgKOH/g) | 0.01 | 0.01 | 0.01 | 0.02 | 0.01 |

TABLE 7

|  |  | Example 2-6 | Example 2-7 | Example 2-8 | Example 2-9 | Example 2-10 |
| --- | --- | --- | --- | --- | --- | --- |
| Evaluation Type of Base Oil | Refrigerant Base Oil | $CO_2$ Base Oil 6 | $CO_2$ Base Oil 7 | $CO_2$ Base Oil 8 | $CO_2$ Base Oil 9 | $CO_2$ Base Oil 10 |
| Antiwear property Test | Wear Depth of Vane (μm) | 7.1 | 6.5 | 6.3 | 6.3 | 6.4 |
| Stability Test | Appearance | no deposition | no deposition | no deposition | no deposition | no deposition |
|  | Acid Value (mgKOH/g) | 0.03 | 0.02 | 0.01 | 0.02 | 0.01 |

TABLE 8

|  |  | Example 2-11 | Comparative Example 2-1 | Comparative Example 2-2 | Comparative Example 2-3 |
| --- | --- | --- | --- | --- | --- |
| Evaluation Type of Base Oil | Refrigerant Base Oil | $CO_2$ Base Oil 11 | $CO_2$ Base Oil C1 | $CO_2$ Base Oil C2 | $CO_2$ Base Oil B6 |
| Antiwear property Test | Wear Depth of Vane (μm) | 8.5 | 9.9 | 10.3 | 11.1 |
| Stability Test | Appearance | no deposition | no deposition | no deposition | no deposition |
|  | Acid Value (mgKOH/g) | 0.01 | 0.01 | 0.01 | 0.08 |

TABLE 9

|  |  | Example 3-1 | Example 3-2 | Example 3-3 | Example 3-4 | Example 3-5 |
| --- | --- | --- | --- | --- | --- | --- |
| Evaluation Type of Base Oil | Refrigerant Base Oil | R404A Base Oil 1 | R404A Base Oil 2 | R404A Base Oil 3 | R404A Base Oil 4 | R404A Base Oil 5 |
| Antiwear property Test | Wear Depth of Vane (μm) | 9.1 | 8.8 | 8.2 | 7.9 | 7.5 |
| Stability Test | Appearance | no deposition | no deposition | no deposition | no deposition | no deposition |
|  | Acid Value (mgKOH/g) | 0.01 | 0.02 | 0.02 | 0.02 | 0.02 |

TABLE 10

|  |  | Example 3-6 | Example 3-7 | Example 3-8 | Example 3-9 | Example 3-10 |
| --- | --- | --- | --- | --- | --- | --- |
| Evaluation Type of Base Oil | Refrigerant Base Oil | R404A Base Oil 6 | R404A Base Oil 7 | R404A Base Oil 8 | R404A Base Oil 9 | R404A Base Oil 10 |
| Antiwear property Test | Wear Depth of Vane (μm) | 7.4 | 6.9 | 6.6 | 6.8 | 7.0 |

TABLE 10-continued

|  |  | Example 3-6 | Example 3-7 | Example 3-8 | Example 3-9 | Example 3-10 |
|---|---|---|---|---|---|---|
| Stability Test | Appearance | no deposition | no deposition | no deposition | no deposition | no deposition |
|  | Acid Value (mgKOH/g) | 0.03 | 0.02 | 0.01 | 0.03 | 0.02 |

TABLE 11

|  |  | Example 3-11 | Comparative Example 3-1 | Comparative Example 3-2 | Comparative Example 3-3 |
|---|---|---|---|---|---|
| Evaluation Type | Refrigerant of Base Oil | R404A Base Oil 11 | R404A Base Oil C1 | R404A Base Oil C2 | R404A Base Oil B6 |
| Antiwear property Test | Wear Depth of Vane (μm) | 9.5 | 10.3 | 9.9 | 11.3 |
| Stability Test | Appearance | no deposition | no deposition | no deposition | no deposition |
|  | Acid Value (mgKOH/g) | 0.01 | 0.01 | 0.01 | 0.1 |

TABLE 12

|  |  | Example 4-1 | Example 4-2 | Example 4-3 | Example 4-4 | Example 4-5 |
|---|---|---|---|---|---|---|
| Evaluation Type | Refrigerant of Base Oil | R134a Base Oil 1 | R134a Base Oil 2 | R134a Base Oil 3 | R134a Base Oil 4 | R134a Base Oil 5 |
| Antiwear property Test | Wear Depth of Vane (μm) | 9.5 | 8.6 | 8.5 | 8.2 | 7.8 |
| Stability Test | Appearance | no deposition | no deposition | no deposition | no deposition | no deposition |
|  | Acid Value (mgKOH/g) | 0.01 | 0.02 | 0.01 | 0.01 | 0.02 |

TABLE 13

|  |  | Example 4-6 | Example 4-7 | Example 4-8 | Example 4-9 | Example 4-10 |
|---|---|---|---|---|---|---|
| Evaluation Type | Refrigerant of Base Oil | R134a Base Oil 6 | R134a Base Oil 7 | R134a Base Oil 8 | R134a Base Oil 9 | R134a Base Oil 10 |
| Antiwear property Test | Wear Depth of Vane (μm) | 7.5 | 7.3 | 6.9 | 7.1 | 7.2 |
| Stability Test | Appearance | no deposition | no deposition | no deposition | no deposition | no deposition |
|  | Acid Value (mgKOH/g) | 0.01 | 0.02 | 0.01 | 0.01 | 0.02 |

TABLE 14

|  |  | Example 4-11 | Comparative Example 4-1 | Comparative Example 4-2 | Comparative Example 4-3 |
|---|---|---|---|---|---|
| Evaluation Type | Refrigerant of Base Oil | R134a Base Oil 11 | R134a Base Oil C1 | R134a Base Oil C2 | R134a Base Oil B6 |
| Antiwear property Test | Wear Depth of Vane (μm) | 9.8 | 13.4 | 11.1 | 10.3 |
| Stability Test | Appearance | no deposition | no deposition | no deposition | no deposition |
|  | Acid Value (mgKOH/g) | 0.01 | 0.01 | 0.01 | 0.1 |

TABLE 15

|  |  | Example 5-1 | Example 5-2 | Example 5-3 | Example 5-4 | Example 5-5 |
|---|---|---|---|---|---|---|
| Evaluation Type | Refrigerant Base Oil | R410A Base Oil 1 | R410A Base Oil 2 | R410A Base Oil 3 | R410A Base Oil 4 | R410A Base Oil 5 |
| Antiwear property Test | Wear Depth of Vane (μm) | 10.5 | 9.9 | 9.5 | 9.3 | 9.2 |
| Stability Test | Appearance | no deposition | no deposition | no deposition | no deposition | no deposition |
|  | Acid Value (mgKOH/g) | 0.02 | 0.02 | 0.01 | 0.02 | 0.02 |

TABLE 16

|  |  | Example 5-6 | Example 5-7 | Example 5-8 | Example 5-9 | Example 5-10 |
|---|---|---|---|---|---|---|
| Evaluation Type | Refrigerant Base Oil | R410A Base Oil 6 | R410A Base Oil 7 | R410A Base Oil 8 | R410A Base Oil 9 | R410A Base Oil 10 |
| Antiwear property Test | Wear Depth of Vane (μm) | 8.8 | 8.5 | 8.2 | 8.4 | 8.5 |
| Stability Test | Appearance | no deposition | no deposition | no deposition | no deposition | no deposition |
|  | Acid Value (mgKOH/g) | 0.01 | 0.02 | 0.01 | 0.01 | 0.01 |

TABLE 17

|  |  | Example 5-11 | Comparative Example 5-1 | Comparative Example 5-2 | Comparative Example 5-3 |
|---|---|---|---|---|---|
| Evaluation Type | Refrigerant Base Oil | R410A Base Oil 11 | R410A Base Oil C1 | R410A Base Oil C2 | R410A Base Oil B6 |
| Antiwear property Test | Wear Depth of Vane (μm) | 11.0 | 18.3 | 12.8 | 15.5 |
| Stability Test | Appearance | no deposition | no deposition | no deposition | no deposition |
|  | Acid Value (mgKOH/g) | 0.01 | 0.01 | 0.01 | 0.12 |

INDUSTRIAL APPLICABILITY

The working fluid composition for a refrigerating machine and the refrigerating machine oil of the present invention are excellent in the antiwear property even under severe lubrication conditions, and hence have a remarkable effect of greatly improving the lubricity. Accordingly, they can be suitably used in a refrigerating/air conditioning system with high cooling efficiency including a compressor, a condenser, a throttle device, an evaporator and the like for circulating a refrigerant among these, in particular, in a system including a rotary type, swing type or scroll type compressor, and hence are useful in the fields of room air conditioners, package air conditions, refrigerators, vehicle air conditioners, industrial refrigerating machines and the like.

The invention claimed is:

1. A working fluid composition for a refrigerating machine, comprising:
a refrigerant and a refrigerating machine oil comprising a base oil,
wherein the base oil is a mixture of a complex ester (A) and a polyol ester (B);
wherein (A) is synthesized from at least one first polyhydric alcohol selected from neopentyl glycol and trimethylolpropane, and optionally a second alcohol selected from C2 to C10 dihydric alcohols except neopentyl glycol, a polybasic acid having 6 to 12 carbon atoms, and a monohydric alcohol having 4 to 18 carbon atoms, and
(B) is synthesized from at least one polyhydric alcohol selected from neopentyl glycol, trimethylolpropane, pentaerythritol and dipentaerythritol, and at least one monocarboxylic fatty acid having 4 to 18 carbon atoms,
wherein the mass ratio of (A) to (B) in the base oil is 5/95 to 95/5; and
wherein the refrigerant is selected from carbon dioxide, 1,1,1,2-tetrafluoroethane, a mixture of difluoromethane and pentafluoroethane, a mixture of difluoromethane, pentafluoroethane and 1,1,1,2-tetrafluoroethane, and a mixture of pentafluoroethane, 1,1,1,2-tetrafluoroethane and 1,1,1-trifluoroethane.

2. The working fluid composition for a refrigerating machine according to claim 1, wherein (A) is synthesized from at least one first polyhydric alcohol selected from neopentyl glycol and trimethylolpropane, a polybasic acid having 6 to 12 carbon atoms, and a monohydric alcohol having 4 to 18 carbon atoms.

3. The working fluid composition for a refrigerating machine according to claim 1, wherein the polybasic acid constituting (A) is at least one selected from adipic acid and sebacic acid.

4. The working fluid composition for a refrigerating machine according to claim 1, wherein the monohydric alcohol constituting (A) is a monohydric alcohol having 8 to 10 carbon atoms.

5. The working fluid composition for a refrigerating machine according to claim 1, wherein (B) is synthesized from at least one selected from neopentyl glycol and pentaerythritol, and at least one selected from monocarboxylic fatty acids having 4 to 9 carbon atoms.

6. The working fluid composition for a refrigerating machine according to claim 1, wherein (B) is synthesized from pentaerythritol, and a mixed fatty acid of a branched fatty acid having 4 carbon atoms and 3,5,5-trimethyl-hexanoic acid.

7. The working fluid composition for a refrigerating machine according to claim 1, wherein (A) is synthesized from at least one first polyhydric alcohol selected from neopentyl glycol and trimethylolpropane, a polybasic acid having 6 to 12 carbon atoms, and a monohydric alcohol having 4 to 18 carbon atoms.

8. A refrigerating machine oil comprising a base oil, wherein the base oil is a mixed ester of complex ester (A) and a polyol ester (B);
   wherein (A) is synthesized from at least one first polyhydric alcohol selected from neopentyl glycol and trimethylolpropane, and optionally a second alcohol selected from C2 to C10 dihydric alcohols except neopentyl glycol, a polybasic acid having 6 to 12 carbon atoms, and a monohydric alcohol having 4 to 18 carbon atoms, and
   (B) is synthesized from at least one polyhydric alcohol selected from neopentyl glycol, trimethylolpropane, pentaerythritol and dipentaerythritol, and at least one selected from monocarboxylic fatty acids having 4 to 18 carbon atoms,
   wherein the mass ratio of (A) to (B) in the base oil is 5/95 to 95/5.

9. The refrigerating machine oil according to claim 8, wherein (A) is synthesized from at least one first polyhydric alcohol selected from neopentyl glycol and trimethylolpropane, a polybasic acid having 6 to 12 carbon atoms, and a monohydric alcohol having 4 to 18 carbon atoms.

* * * * *